United States Patent [19]

Dolecek

[11] Patent Number: 4,974,188

[45] Date of Patent: Nov. 27, 1990

[54] ADDRESS SEQUENCE GENERATION BY MEANS OF REVERSE CARRY ADDITION

[75] Inventor: Quentin E. Dolecek, Burtonsville, Md.

[73] Assignee: The Johns Hopkins University, Baltimore, Md.

[21] Appl. No.: 282,364

[22] Filed: Dec. 9, 1988

[51] Int. Cl.$^5$ ............................................. G06F 7/50
[52] U.S. Cl. .................................... 364/784; 364/787
[58] Field of Search ................ 364/784, 786, 787, 726

[56] References Cited

U.S. PATENT DOCUMENTS

| | | | |
|---|---|---|---|
| 3,602,705 | 8/1971 | Cricchi et al. | 364/786 |
| 3,925,652 | 12/1975 | Miller | 364/787 |
| 4,052,604 | 10/1977 | Maitland et al. | 364/786 |
| 4,181,976 | 1/1980 | Collins et al. | 364/900 |
| 4,831,570 | 5/1989 | Abiko | 364/715.01 |
| 4,897,808 | 1/1990 | Nakagawa | 364/784 |

OTHER PUBLICATIONS

Kohavi, "Switching and Finite Automata Theory", 1970 by McGraw-Hill, Inc., pp. 132-138.

Primary Examiner—Dale M. Shaw
Assistant Examiner—Tan V. Mai
Attorney, Agent, or Firm—Robert E. Archibald; Howard W. Califano

[57] ABSTRACT

An apparatus and method is disclosed for generating a bit reversed sequence. The apparatus includes a reverse addition means for adding binary words in most significant to least significant bit order with the overflow or carry bit propagated to the left. The invention is used to generate a bit reversed address and/or an address sequence that is mapped into a "closed" space.

10 Claims, 4 Drawing Sheets

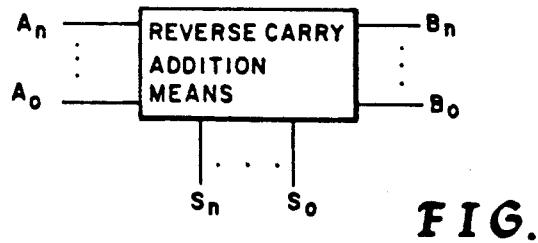
FIG. 1
```
000    001    010    011    100    101    110    111
+001   +001   +001   +001   +001   +001   +001   +001
────   ────   ────   ────   ────   ────   ────   ────     NORMAL
001    010    011    100    101    110    111    000     ADDITION
000    100    010    110    001    101    011    111
r100   r100   r100   r100   r100   r100   r100   r100    BIT REVERSE
────   ────   ────   ────   ────   ────   ────   ────    ADDITION
100    010    110    001    101    011    111    000
```
FIG. 2
FULL ADDER TRUTH TABLE
| INPUT | | | OUTPUT | |
|---|---|---|---|---|
| A | B | Z | S | C |
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |
FIG. 3a
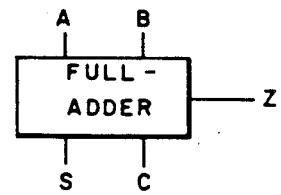
FIG. 3b
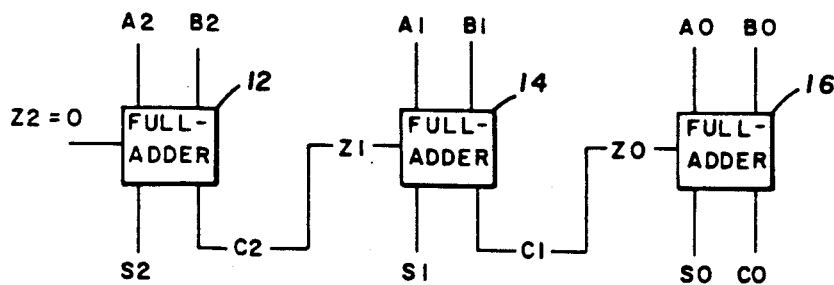
FIG. 3c

ADDRESS SEQUENCE GENERATION BY MEANS OF REVERSE CARRY ADDITION

STATEMENT OF GOVERNMENTAL INTEREST

The Government has rights in this invention pursuant to Contract No. N00039-87-C-5301 awarded by the Department of the Navy.

BACKGROUND OF THE INVENTION

1. Field of the Invention

This invention relates to a new method and apparatus for generating a bit reversed sequence. More particularly, the invention teaches a reverse addition means which adds binary words in most significant to least significant bit order with the overflow or carry bit propagated to the left. The reverse addition means can be used in an address generator to generate a bit reversed address and/or an address sequence that is mapped into a "closed" space.

2. Description of the Prior Art

Most FFT (Fast Fourier Transform) algorithms require bit reversal addressing of either the input or output data buffer in order for the output sequence of the algorithm to be in natural order. For example, an eight-point decimation in time FFT algorithm requires the input sequence to be stored in the shuffled order x(0), x(4), x(2), x(6), x(1), x(5), x(3), x(7) for the output data order to be X(0), X(1), X(2), X(3), X(4), X(5), X(6), X(7). A simple definition of bit reversed order is thus: If one forms the K-bit binary representation of the natural order indices of a sequence of numbers, where the number of numbers in the sequence is a power of 2, and reverses the bits in the binary representation of the indices the resulting numbers are the indices of the bit reversed sequence of numbers. The process is shown in Table 1 for a sequence of N=8 numbers, i.e., K=3.

TABLE 1

| Index | Binary Representation | Bit Reversed Binary | Bit Reversed Index |
|---|---|---|---|
| 0 | 000 | 000 | 0 |
| 1 | 001 | 100 | 4 |
| 2 | 010 | 010 | 2 |
| 3 | 011 | 110 | 6 |
| 4 | 100 | 001 | 1 |
| 5 | 101 | 101 | 5 |
| 6 | 110 | 011 | 3 |
| 7 | 111 | 111 | 7 |

In Table 1 the natural order indices are as shown at the left, whereas the bit reversed indices are as shown at the right of the table. Table 2 shows the same process for N=16. Note that the result depends on the order (K) of the sequence. Thus, in order to shuffle a sequence from its natural order to a bit reversed order, either bit reversing hardware or an algorithm is required in addressing the buffer containing the sequence.

TABLE 2

| Index | Binary Representation | Bit Reversed Binary | Bit Reversed Index |
|---|---|---|---|
| 0 | 0000 | 0000 | 0 |
| 1 | 0001 | 1000 | 8 |
| 2 | 0010 | 0100 | 4 |
| 3 | 0011 | 1100 | 12 |
| 4 | 0100 | 0010 | 2 |
| 5 | 0101 | 1010 | 10 |
| 6 | 0110 | 0110 | 6 |
| 7 | 0111 | 1110 | 14 |
| 8 | 1000 | 0001 | 1 |
| 9 | 1001 | 1001 | 9 |
| 10 | 1010 | 0101 | 5 |
| 11 | 1011 | 1101 | 13 |
| 12 | 1100 | 0011 | 3 |
| 13 | 1101 | 1011 | 11 |
| 14 | 1110 | 0111 | 7 |
| 15 | 1111 | 1111 | 15 |

One prior art method is to use hardware logic to directly reverse the address bits going to a buffer. This method is implemented either by wiring the bits in reversed order to the buffer or by using a multiplexer to select the designation of each address bit. The first implementation is limited to applications requiring only one fixed size address space (e.g., only one Fast Fourier Transform size). The second prior art implementation requires the multiplexer to be designated for a predefined number of address space sizes.

Another prior art method is to use a bit reversed counter program. The following shows a typical flow chart used for such a prior art method:

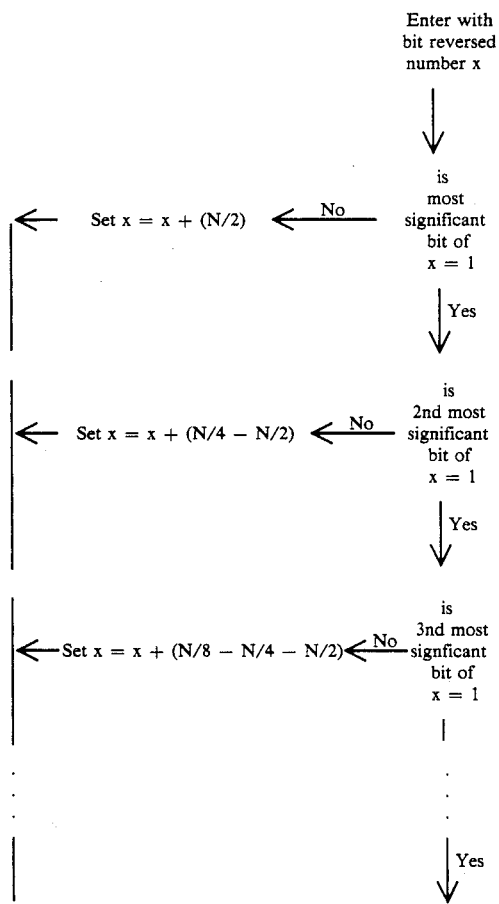

-continued

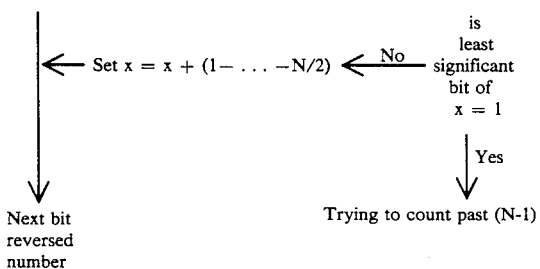

Next bit reversed number

Trying to count past (N-1)

Beginning with the first bit reversed number, 000 in Table 1 or 2, the program generates the remaining bit reversed indices in order. This method is usually implemented using a computer or microprocessor, and is too slow for high speed FFT hardware applications.

U.S. Pat. No. 4,181,976 discloses a prior art bit reverse apparatus that is adapted for use as an address generator for an FFT processor.

SUMMARY OF THE INVENTION

The present inventor has developed the new concept of "reversed carry addition". Reversed Carry Addition can be used to generate address sequences of bit reversed indices and address sequence that are mapped within a "closed" memory space. Unlike the prior art, an address generator designed in accordance with this invention can be programmable, with the base or starting address and the sequence size being programmable.

The inventor discovered that by propagating the carry bit in the opposite direction than that used in normal addition, and by adding binary words from most significant to least significant digit, that a bit reversed number is produced. This procedure is performed by a reverse carry means. The reverse carry means receives two binary words ($A_n \ldots A_o$) and ($B_n \ldots B_o$). The bits from the words are added in order of most to least significant bit with the carry bit propagated to the right. The reverse carry adder produces a bit reversed output ($S_n \ldots S_o$).

To generate an address sequence, the reverse carry means receives as inputs: (1) a start or base address (word $A_n \ldots A_o$); and, (2) a binary incrementing code (word $B_n \ldots B_o$), that designates the sequence size (i.e., the number of address generated and mapped into the "closed" space). The starting address and the binary incrementing code are first processed by the reverse carry means to produce the 2nd address in the sequence. The 2nd address and the binary incrementing code are then processed by the reverse carry means to produce the 3rd address in the sequence. The process is repeated until the entire sequence is generated.

Several circuit embodiments for the reverse carry adder are described in the Specification; and the application of the reverse carry adder in an address generated for an array processor is also taught.

A first novel feature of the present invention is a reversed indices address generator that contains a programmable base address and a programmable sequence size.

A second novel feature is an address generator that provides an address sequence that is mapped into a "closed" space. Thereby, one can maintain separately addressable memory spaces within a memory without the possibility of overlapping locations.

A third novel feature is an address generator in which the address sequence is generated by reversed carry addition. Reverse carry addition is performed by a means that propagates the carry bit from most significant to least significant bit locations and adds the binary digits in the most significant to least significant digit order.

BRIEF DESCRIPTION OF THE FIGURES

FIG. 1 is a block diagram showing the reverse carry addition means as taught by the present invention.

FIG. 2 is a sample demonstration using both normal and reverse carry addition.

FIG. 3a is a Full-Adder Truth Table; FIG. 3b is a block diagram of a Full-Adder; and, FIG. 3c is a cascade array of Full-Adders.

DETAILED DESCRIPTION OF THE PREFERRED EMBODIMENT

Figure 4:
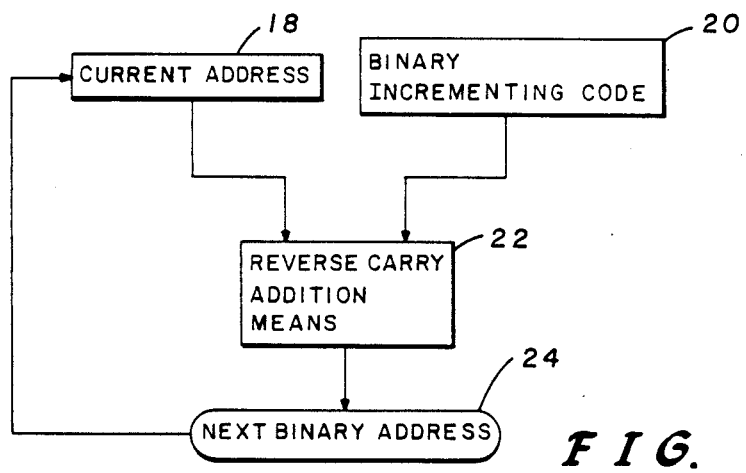
FIG. 4 illustrates how the reverse carry addition means can generate an address sequence.

The present method and apparatus for generating bit reverse address sequences utilizes a unique reverse carry adder. The inventor discovered that by propagating the carry bit in the opposite direction than is used in normal binary addition, that reverse bit addition results. The inventor calls this technique reverse carry addition. FIG. 1 is a block diagram of this novel reverse carry adder means. In operation, two n-bit binary words ($A_n \ldots A_o$) and ($B_n \ldots B_o$) where $A_n$ and $B_n$, the most significant bits, are added with the carry bit propagated in the direction reversed from normal addition to provide a reversed bit output ($S_n \ldots S_o$). To accomplish this operation the reverse carry addition means 10 adds the corresponding bits of the binary words ($A_n \ldots A_o$) and ($B_n \ldots B_o$) in most significant to least significant bit order with the overflow or carry bit propagated from the most significant bit addition to the least significant bit addition. (Note that reverse carry addition is quite different and unique from normal addition where bits are added from least significant to most significant bit order with carry bits propagated from the least significant bit addition to the most significant bit addition.)

FIG. 2 illustrates these two processes using the symbol "+" to donate normal addition and the symbol "r" to denote bit reversed addition. As shown, with the least significant bit to the right and the most significant bit to the left, bit reversed addition is done by adding the most significant bit first and propagating the carry from right to left, i.e., from the most significant to the least significant bit addition. To illustrate reverse carry addition, words A={110}, and B={100} are processed below. First, we add the most significant digits and propagate the carry to the right.

```
                    1   carry bit
Step 1        1   1   0
            r 1   0   0
              ─────────
                      0
```

In Step 2, we add the next most significant digits with the carry digit and propagate the new carry bit to the right.

```
                1   1     carry bits
Step 2        1   1   0
            r 1   0   0
              ─────────
                  0   0
```

In Step 3, we add the least significant digits with the carry digit and produce the reversed bit output $S_n = \{001\}$.

```
                1   1     carry bits
Step 3        1   1   0
            r 1   0   0
              ─────────
                  0   0   1
```

As shown in FIG. 3, the reverse carry addition means can be implemented by cascading full-adder circuits with the output of each full-adder circuit connected to the carry input of the full-adder circuit on its right. FIG. 3a contains the truth table for a full-adder circuit; FIG. 3b shows a simple block diagram of a full-adder; and, FIG. 3c shows the cascading full-adder circuit arrangement, as taught by the invention, with the carry bit propagating from most significant to least significant bit addition. Further as shown in FIG. 3c, the carry output of each adder is connected to the carry input of the next unit. The information on the carry line will ripple down the units from the most significant position to the least significant position resulting in bit reversed addition. To illustrate the operation of the ripple carry adder, words $A = \{110\}$ and $B = \{100\}$ are reverse carry added. Using full-adder 12, a carry bit of "0" is added to the most significant bit from word A, which is "1", and the most significant bit from word B, which is "1". The resulting binary addition will produce an $S_2$ output of "0" and a carry of "1". Next in full-adder 14, the carry bit "1" is added to the next least significant bits of words A and B, i.e., $A_1 = $ "1" $B_1 = 0$. The resultant output from full-adder 14 will be $S_1 = $ "0" and a carry bit C1 that equals "1". Next, the carry bit C1, which equals "1" is added with the least significant bits of words A and B, which are both "0". The output from full-adder 16 will be $S_0 = $ "1". Therefore, the ripple carry adder has performed the reverse carry addition and produced as an output the word $S_n = \{001\}$. (Note: this is not the only way reverse carry addition can be implemented, as contemplated by the inventor. As will be explained later, carry look-ahead adders, as well as other adder circuits could be designed to implement bit reverse carry addition, as taught by this invention, by reversing the normal direction of calculation and the direction of carry bit propagation. It will also be understood that the sequence generated by the reverse carry addition means can be used for other purposes than address generation.

Address Sequence Generation Using a Reverse Carry Addition Means

We shall now describe how the reverse carry addition means is utilized to generate address sequences. Two types of address sequences will be described: (1) a repetitive bit reverse address sequence; and, (2) a repetitive address sequence that is not bit reversed, but still maps a designated number of address locations into a "closed" memory space. In either case, a binary starting address (or base address) and a binary incrementing code that designates sequence size are inputted to the reverse carry addition means. FIG. 4 is a block diagram illustrating the use of a reverse carry addition means to generate binary address sequences. A current address 18 and a binary incrementing code 20 are input to a reverse carry addition means 22 which result in the generation of the next binary address 24. The next binary address is used by a processing element (not shown) to address each particular memory location. The current address 18 is initially the base address; however, as the next binary address 24 in a sequence is generated, it replaces the original base or last current address 18.

Bit Reverse Address Sequence

The present invention can generate a bit reverse sequence from a start or base address, with the size of the sequence and the base address programmable. (It will be noted that programming the size of the bit reverse address sequence permits computing flexibility and, for example, allows one to easily handle different size FFT transformations.) The sequence size (i.e., the number of words addressed by the sequence) can be programmed by selecting the binary incrementing code as shown in the following TABLE I:

TABLE I

| Sequence Size | Binary Incrementing Codes |
|---|---|
| 2 | 0 . . . 01 |
| 4 | 0 . . . 010 |
| 8 | 0 . . . 0100 |
| 16 | 0 . . . 01000 |
| 32 | 0 . . . 010000 |

The starting or base address can also be selected; however, for particular size sequences certain less significant bits must be "0". Table II illustrates the limitations placed on the starting or base address for a repetitive bit reversed address to be generated (where X = any binary bit).

TABLE II

| Sequence Size | Binary Starting Address |
|---|---|
| 2 | X . . . XXX0 |
| 4 | X . . . XX00 |
| 8 | X . . . X000 |
| 16 | X . . . X0000 |
| 32 | X . . . X00000 |

The following example illustrates a sample calculation of a bit reversed sequence generation, in accordance with the present invention, with a sequence size of 4 and a starting address of $\{010\}$.

| Step 1 |   | 010 | starting address |
|---|---|---|---|
|   | r | 010 | incrementing code |
|   |   | 001 | 2nd address |
| Step 2 |   | 001 | replace starting address with 2nd address |

-continued

|        |       |                              |
|--------|-------|------------------------------|
|        | r 010 |                              |
|        | 011   | 3rd address                  |
| Step 3 | 011   | replace 2nd address with 3rd address |
|        | r 010 |                              |
|        | 000   | 4th address                  |
| Step 4 | 000   | replace 3rd address with 4th address |
|        | r 010 |                              |
|        | 010   | return to starting address   |

Therefore, the resulting reversed bit address sequence, starting at a base address of {010} for a sequence size of 4 words is: $S_n = \{010, 001, 011, 000\}$. This sequence will repeat and is mapped into a "closed" memory space.

"Closed" Space Address Sequence

Now we shall look at the second class of address sequencing. Although this sequence class is not a bit reverse sequence it does provide an address sequence for a "closed" memory space, with the base or starting address and the size of the address sequence programmable. Unlike the bit reverse sequence, for this class any base or starting address can be used. The sequence size is selected by choosing the binary incrementing code shown in Table 3.

TABLE III

| Sequence Size | Binary Incrementing Code |
|---------------|--------------------------|
| 2             | 0 . . . 01               |
| 4             | 0 . . . 01X              |
| 8             | 0 . . . 01XXX            |
| 16            | 0 . . . 01XXXX           |
| 32            | 0 . . . 01XXXXX          |
|               | when X is any bit        |

The following example illustrates the generation of a "closed" address sequence starting with base address {010} for a sequence size of 2.

|        |       |                          |
|--------|-------|--------------------------|
| Step 1 | 010   | base address             |
|        | r 001 |                          |
|        | 011   | 2nd sequence             |
| Step 2 | 011   | replace base address with 2nd sequence |
|        | r 001 |                          |
|        | 010   | return to base address   |

Memory Address Generation for an Array Processor

Figure 5:
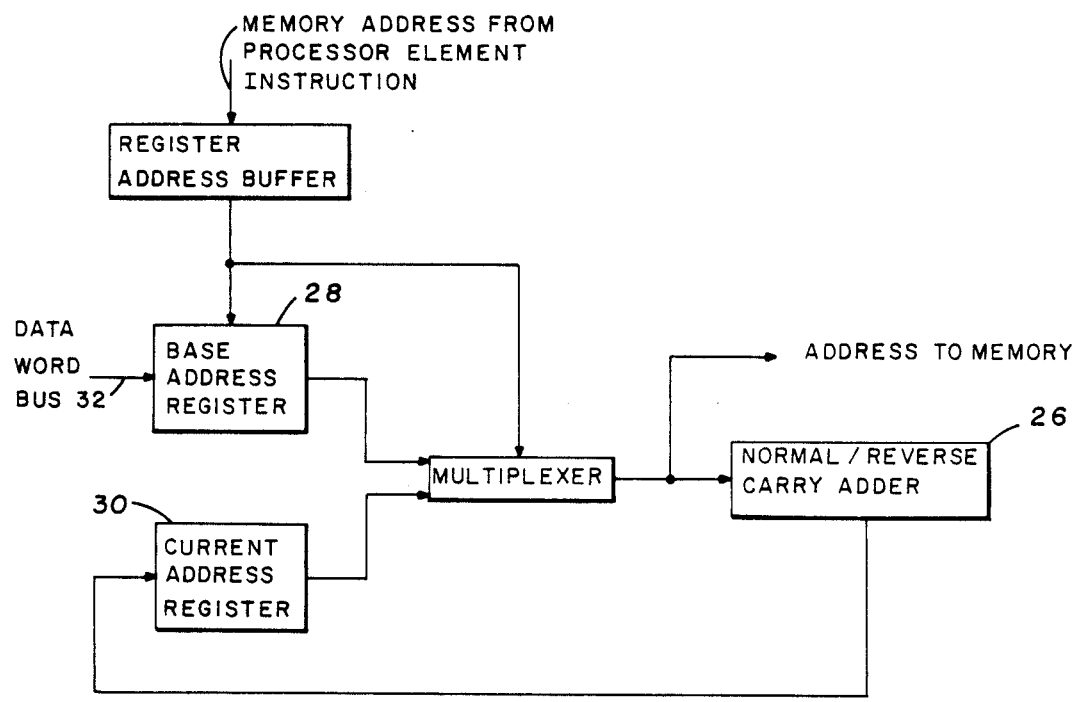
FIG. 5 is an address generated for use with an array processor, as taught by the present invention.

FIG. 5 is a block diagram showing how the reverse carry adder 26 can be combined with a set of base address registers 28 and current address registers 30 to generate memory addresses. This portion of the specification will focus on the use of the reverse carry adder 26 to generate memory addresses in an array processor (see U.S. Pat. No. 4,720,780 for a description of an array processor). As shown in FIG. 5, the Processor Element (not shown) can directly load words into the Base Address Registers 28, via bus 32, and generate addresses for memory words using the normal/reverse carry adder 26. This is accomplished as follows:

1. Each base address register is loaded with an instruction which contains the actual starting address and a binary incrementing code, which indicates how to modify the memory address for the next time memory is addressed. Information to be written into the base address register 28 is read from the same data word bus 32 used to access memory.

2. If the processor element accesses memory using a base register 28, the memory address from the specified base register is sent to the memory circuit and the normal/reverse carry adder circuit 26. Data is read from, or written to, the memory at the address that was contained in the base register. This address is then modified by the normal/reverse carry adder and written into the current address register 30 along with the information on how to modify addresses that was contained in the base register (i.e., the binary incrementing code.)

3. If the processor element accesses memory using a current address register 30, the memory address from the specified current address register is sent to the memory circuit; the address is then modified by the normal/reverse carry adder 26 using the binary incrementing code read from the register and stored back into the current address register 30.

The number of Base Address/Current Address register pairs determines the number of separate "closed" areas, or lists, that the memory can be separated into. It also determines the number of bits required for the processor element to address the memory. For example, using 16 Base Address/Current Address register pairs requires a 6-bit memory address word from the processor element and permits the processor to address the memory in 16 separate areas.

Each Base Address register is loaded with the following information:

1. The starting address for memory access—the length of this address is dependent on the size of the memory. For example, a 16,384 word memory requires 14 bits.

2. The binary increment code to be added to the memory address—the length of this constant is determined by the maximum increment to be possible between words accessed in the memory. For maximum flexibility this constant would be one bit less in length then the length of the memory address word, or 13 bits for our example.

3. A single bit that specifies whether to use normal addition or reversed carry addition.

Thus for our example, the processor can address any one of 16 areas in a 16,384 word memory and modify the address for the next memory access every instruction cycle using a 6-bit memory address bus. Furthermore, the memory address can be incremented by any amount with each access and this incremented can be done in normal arithmetic order using the normal add function or in bit reversed order using the reverse carry add function.

Because the reverse carry adder propagates the carry bit to the right, bit-reversed addressed buffers can be offset in memory by any power of 2 without the possibility of the buffer being incremented pass its upper bound into another buffer area in memory. Thus, bit-reversed addressing can be used to maintain lists of numbers, offset from each other in a "closed" memory space, without the possibility overlapping another buffer if an error is made. For example, using a 4-item list starting at location XXXX00 in memory (where "X" equals any binary bit) the following error could result when an address sequences generated by normal addition is used:

Normal Addition:

XXXX00 is the first word in the list.
    01 add 1,
XXXX01 is the address of the second word in the list,
    01 add 1,
XXXX10 is the address of the third word in the list,
    01 add 1,
XXXX11 is the address of the fourth word in the list,
    01 add 1 (possibly in error),
XXX100 is the address of a word outside the buffer.

However, when an address sequence is generated with carry reverse addition, such an error could not occur since the addresses are mapped into a "closed" space.

Bit-reversed Addition:

XXXX00 is the first word in the list,
    10 Bit-reverse add 1 (incremented code for a 4-item address sequence
XXXX10 is the address of the second word in the list,
    10 Bit-reverse add 1,
XXXX01 is the address of the third word in the list,
    10 Bit-reverse add 1,
XXXX11 is the address of the-fourth word in the list,
    10 Bit-reverse add 1 (possibly in error - or to start over),
XXXX00 is the address of the first word in the list.

However, when an address sequence is generated with carry reverse addition so such error could occur since the addresses are mapped into a "closed" space:

Alternative Embodiments for Reverse Carry Addition Means

Figure 6:
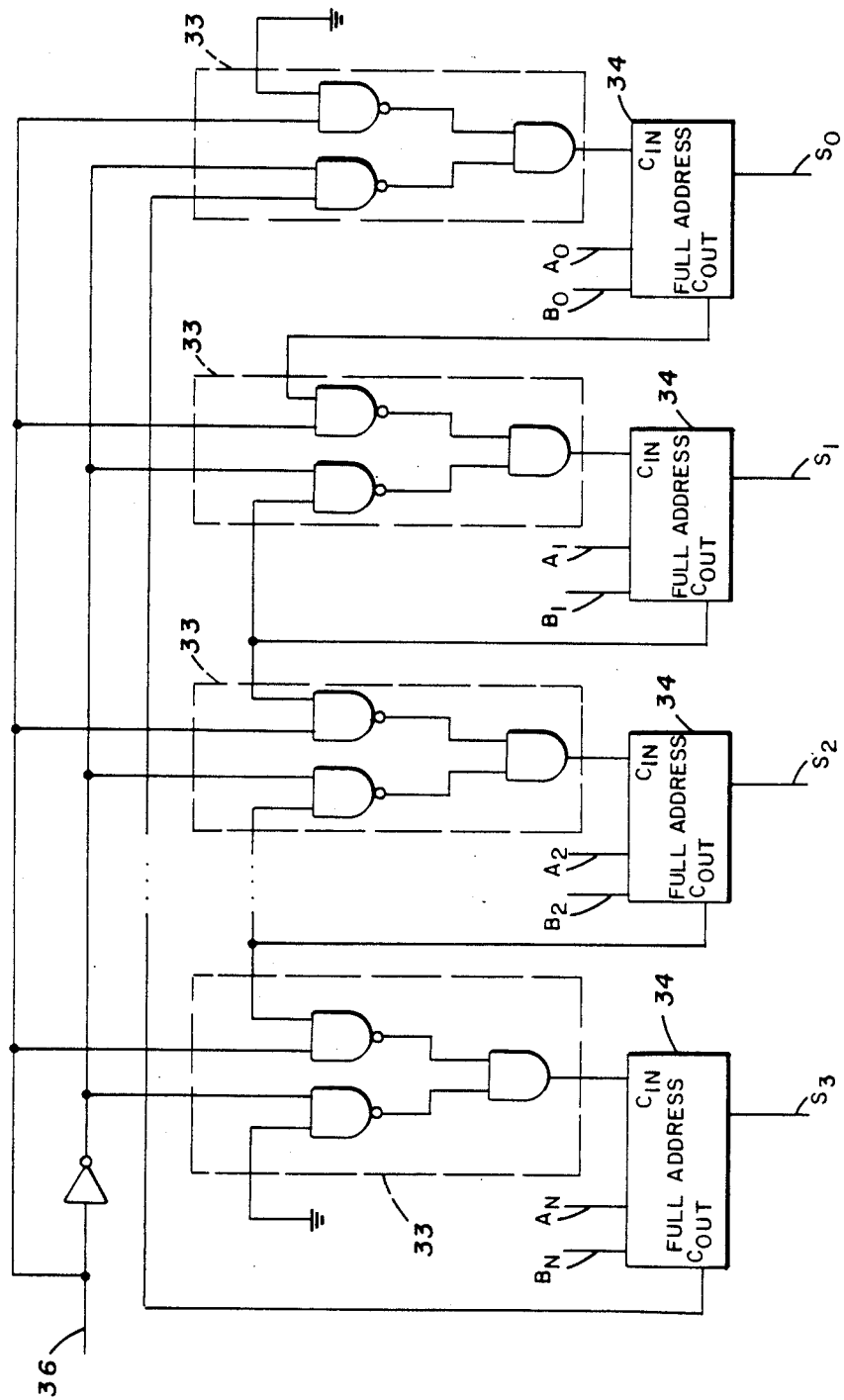
FIG. 6 is a Full-Adder array that can perform both normal and reverse carry addition.

FIG. 6 is a circuit diagram for a normal/reverse carry adder as taught by the present invention which can either perform normal addition, propagating the carry bit to the left, or perform bit reversed addition with the carry bit propagating to the right. Multiplexers 33 are shown to control the direction that carry bits are propagated. A plurality of ripple carry full-adders are configured in a linear array. Directional signal 36 causes the circuit to perform normal addition when true and reversed carry addition when false.

Figure 7:
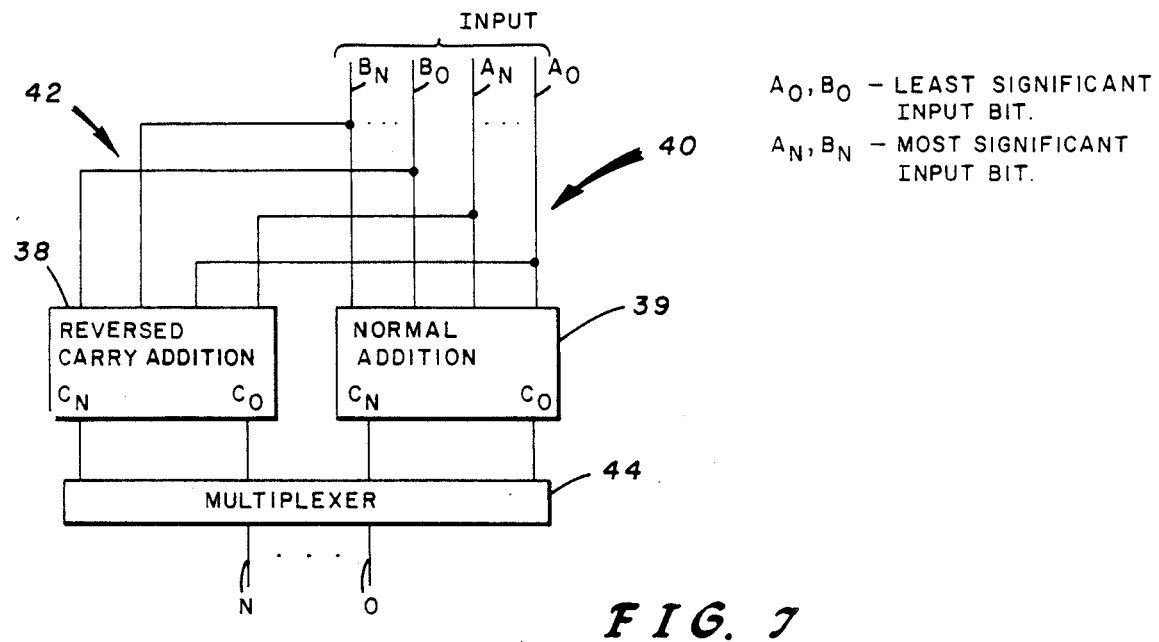
FIG. 7 is an address generator designed in accordance with the present invention, that uses two look-ahead adder circuits.

For high speed memories, the time required by a ripple carry full-adder to perform normal or bit reverse addition is often too slow for the addition to be completed in one memory access time. The embodiment shown in FIG. 7 overcomes this problem by using two look-ahead adder circuits 38, 39. The inputs to one are in normal order 40; the inputs to the other are reversed 42 so that the most significant input bit is connected to the least significant input bit of adder 38 and the least significant input bit is connected to the most significant input of the adder 38. The output is then selected using multiplexer 44. It will, of course, be noted that both the ripple counter reverse.carry adder and the carry look-ahead adder could be implemented using gate arrays or custom silicon microcircuits.

It will be further understood that other addition circuits can be modified to perform reverse carry addition, as contemplated by this invention. By way of example, FIG. 8 discloses an embodiment of an N-bit carry-look-ahead bit reverse adder. This example uses the basic addition equation for a 4-bit ripple carry reverse bit adder using 4 full-adder circuits cascaded in a linear array with the carry propagating from left to right. The full-adder equations with a carry propagating to the right is as follows:

$$S_i = (X_i \oplus Y_i) + C_{i+i} = P_i \oplus C_{i+i}$$

where
$$P_i = (X_i \oplus Y_i) \text{ and}$$

$$C_i = X_i Y_i + C_{i+i}(X_i \oplus Y_i) = G_i + C_{i+1} P_i$$

where
$$G_i = X_i \cdot Y_i$$

The sum and carry expression for the 4-bit adder are then, $$
\begin{aligned}
C_4 &= 0 = C_{in} \\
C_3 &= G_3 + C_{in} P_3 \quad S_3 = P_3 \oplus C_{in} \\
C_2 &= G_2 + C_3 P_2 \quad S_2 = P_2 \oplus C_3 \\
C_1 &= G_1 + C_2 P_1 \quad S_1 = P_1 \oplus C_2 \\
C_0 &= G_o + C_1 P_o \quad S_o = P_o \oplus C_1
\end{aligned}
$$

Figure 8:
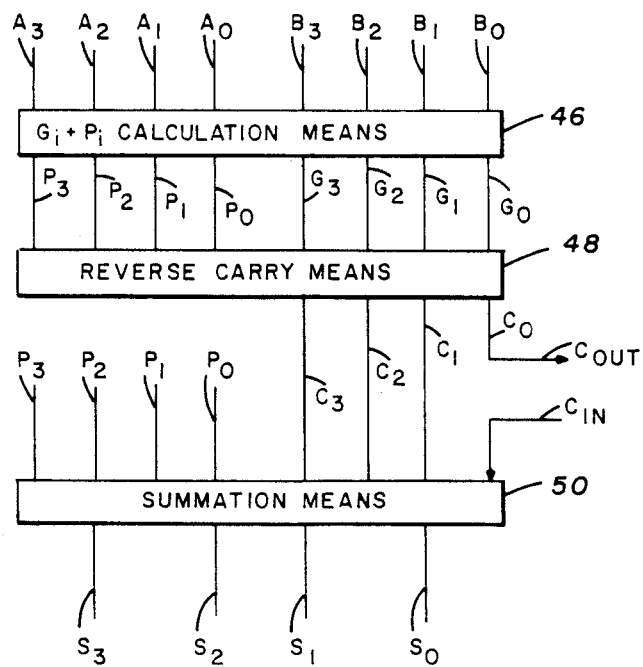
FIG. 8 is an N-bit carry-look ahead bit reverse adder as taught by the present invention.

The embodiment shown in FIG. 8 uses digital logic to calculate the above equations. A calculation means 46 receives binary words $A_n$ and $B_n$ as inputs for calculating the generation functions ($G_i$) and propagation functions ($P_i$). A reverse carry means 48 receives the generation functions ($G_i$) and propagation functions ($P_i$) as inputs, for calculating reverse carry expressions ($C_i$):

$$C_n = 0 = C_{in}$$

$$C_{i-1} = G_{i-1} + C_i P_{i-1}.$$

for i=n to 0

A summation means 50 receives as input the reverse carry expression ($C_i$) and the propagation functions ($P_i$) for calculating the output summation expressions ($S_i$) where $$S_n = P_{n-1} + C_n$$

$$S_{i-1} = P_{i-1} + C_i$$

for i=n to 0

It is to be understood that other adder circuits could be modified, as taught by the invention, to perform reverse carry addition, with the order of addition from most significant to least significant bits and the carry bit propagated to the left. Obviously, many modifications and variations of the present invention are possible in light of the above teaching. It is, therefore, to be understood that within the scope of the appended claims the invention may be practiced otherwise than as specifically described.

What is claimed is:

1. An apparatus for generating a repetitive bit reverse address sequence starting at a selected binary starting address and using a binary incrementing code to designate sequence size, said apparatus comprising:

a current address register loaded with an instruction containing a current binary address and information designating said binary incrementing code, wherein said current binary address is initially said binary starting address;

a reverse carry addition means coupled to said current address register for reverse carry addition of said incrementing code with said current binary address to generate a next binary address in said bit reverse address sequence, wherein said next binary address is written into said current address register as said current address, wherein said binary incrementing code is an n-bit binary word selected from one of:

| Sequence size | Binary incrementing code |
|---|---|
| 2 | 0 . . . 01 |
| 4 | 0 . . . 010 |
| 8 | 0 . . . 0100 |
| 16 | 0 . . . 01000 |
| 32 | 0 . . . 010000 | wherein said incrementing code is selected to program the bit reverse address sequence size and therefore the number of address locations mapped into a particular closed memory space.

2. The apparatus of claim 1, wherein said binary starting address is an n-bit binary word having the following format:

| Sequence size | Binary Starting Address |
|---|---|
| 2 | X . . . XXX0 |
| 4 | X . . . XX00 |
| 8 | X . . . X000 |
| 16 | X . . . X0000 |
| 64 | X . . . X00000 | where X is any binary bit.

3. The apparatus of claim 2, wherein said reverse carry adder means further comprises: a plurality of full-adder circuits cascaded to form a ripple carry array with the output carry of each particular full-adder circuit connected to the carry input of the full-adder circuit to right of said particular full-adder circuit, wherein carry information ripples from most significant bit addition to the leasdt significant bit addition and said full-adder circuits produces as an output a next binary address in said bit feverse sequence.

4. The apparatus of claim 2, wherein said reverse carry adder means further comprises:
   a look-ahead adder circuit having inputs ($X_n$ . . . $X_o$) and ($Y_n$ . . . $Y_o$) producing as an output a next binary address in said bit reverse sequence where $X_n$ and $Y_n$ are most significant bits;
   a means for inputting the current binary address ($A_n$ . . . $A_o$) in reversed order so that the most significant bit ($A_n$) is connected to the least significant input bit ($X_{ok}$) of said look-ahead adder circuit; and,
   a means for inputting the binary incrementing code ($B_n$ . . . $B_o$) in reversed order so that the most significant input bit ($Y_o$) of said look-ahead adder circuit, so taht the carry bit propagation in the look-ahead adder circuit propagates from most significant bit position to least significant bit position.

5. The apparatus of claim 2, wherein said reverse carry adder means further comprises:
   a calculation means, receiving said current address ($A_n$ . . . $A_o$) and said binary incrementing code ($B_n$ . . . $B_o$) as inputs, for calculating generation functions ($G_i$) and propagation functions ($P_i$) for i=0 to n, where $G_i = A_i B_i$ $P_i = A_i \oplus B_i$;

a reverse carry means, coupled to said calculation means to receive said generation functions ($G_i$) and propagation functions ($P_i$) as inputs, for calculating reverse carry expressions ($C_i$) for i=1 to n where, $C_n = 0$ $C_{i-1} = G_{i-1} + C_i P_{i-1}$; and, a summation means coupled to said calculation means and said reverse carry means to receive propagation functions ($P_i$) and reverse carry expressions ($C_i$) for calculating and providing as output summation expressions ($S_i$) where $S_n = P_{n-1} + C_{in}$ and $S_{i-1} = P_{i-1} + C_i$ for i=n to 0, wherein $S_i$ is a next binary address in said bit reverse sequence.

6. An apparatus for generating a repetitive address sequence starting at a selected binary starting address and using a binary incrementing code to designate the number of address locations mapped into a closed memory space, said apparatus comprising:
   a current address register loaded with an instruction containing a current binary address and information designating said binary incrementing code, wherein said current binary address is initially said binary starting address; and,
   a reverse carry addition means coupled to said current address register for reverse carry addition of said incrementing code with said current binary address to generate a next binary address, wherein said next binary address is written into said current address register as said current address, wherein said binary incrementing code is an n-bit binary word selected from one of:

| Sequence Size | Binary Starting Address |
|---|---|
| 2 | 0 . . . 01 |
| 4 | 0 . . . 01X |
| 8 | 0 . . . 01XX |
| 16 | 0 . . . 01XXX |
| 32 | 0 . . . 01XXXX |
| 64 | 0 . . . 01XXXXX | wherein X is any binary bit and wherein said incrementing code is selected to program the address sequence size and therefore the number of address locations mapped into a particular closed memory space.

7. The apparatus of claim 6, wherein said binary starting address is any n-bit binary word.

8. The apparatus of claim 7, wherein said reverse carry adder means further comprises:
   a plurality of full-adder circuits cascaded to form a ripple carry array with the output carry of each full-adder circuit connected to the carry input of the full-adder circuit to its right, wherein carry information ripples from most significant bit addition to the least significant bit addition and said full-adder circuits produces as an output a next binary address.

9. The apparatus of claim 7, wherein said reverse carry adder means further comprises:
   a look-ahead adder circuit having inputs ($X_n$ . . . $X_o$) and ($Y_n$ . . . $Y_o$) producing as an output a next binary address ($S_h$ . . . $S_o$) where $X_n$ and $Y_n$ are most significant bits;
   a means for inputting current binary address ($A_n$ . . . $A_o$) in reversed order so that the most significant bit ($A_n$) is connected to the least significant input bit ($X_o$) of said look-ahead adder circuit; and, a means for inputting the binary incrementing code ($B_n \ldots B_o$) in reversed order so that the most significant bit ($B_n$) is connected to the least significant input bit ($Y_o$) of said look-ahead adder circuit, so that the carry bit propagation in the look-ahead adder circuit propagates from most significant bit position to least significant bit position.

10. The apparatus of claim 16, wherein said reverse carry adder means further comprises:

a calculation means, receiving said current binary address ($A_n \ldots A_o$) and said binary incrementing code ($B_n \ldots B_o$) as inputs, for calculating generation functions ($G_i$) and propagation functions ($P_i$) for i=0 to n, where $$G_i = A_i B_i$$

$$P_i = A_i \oplus B_i;$$

a reverse carry means, coupled to said calculation means to receive said generation functions ($G_i$) and propagation functions ($P_i$) as inputs, for calculating reverse carry expressions ($C_i$) for i=1 to n where, $$C_n = 0$$

$$C_{i-1} = G_{i-1} + C_i P_{i-1}; \text{ and,}$$

a summation means coupled to said calculation means and said reverse carry means to receive propagation functions ($P_i$) and reverse carry expressions ($C_i$) for calculating and providing as output summation expressions ($S_i$) where $S_n = P_{n-1} + C_n$ and $S_{i-1} = P_{i-1} + C_i$ for i=n to 0, wherein $S_i$ is a next binary address.

* * * * *

UNITED STATES PATENT AND TRADEMARK OFFICE
CERTIFICATE OF CORRECTION

PATENT NO. : 4,974,188

DATED : November 27, 1990

INVENTOR(S) : Quentin E. Dolecek

It is certified that error appears in the above-identified patent and that said Letters Patent is hereby corrected as shown below:

Column 11, line 38, delete "feverse" and substitute therefor -- reverse --.

Column 11, line 48, delete "$X_{ok}$" and substitute therefor -- $X_o$ --.

Column 11, line 52, after "icant" insert -- bit ($B_n$) is connected to the least significant --.

Column 11, line 53, delete "taht" and substitute therefor -- that --.

Column 12, line 6, delete line as shown and substitute therefor -- $C_{i-1} = G_{i-1} + C_i \cdot P_{i-1}$; and --.

Column 12, line 12, delete "$S_{i-1}=P_{i-1}+C_i$ for i=n to 0", and substitute therefor -- $S_{i-i} = P_{i-1} + C_i$ for i = n to 0, --.

Column 13, line 17, delete equation and substitute therefor -- $G_i = A_i \cdot B_i$ --.

UNITED STATES PATENT AND TRADEMARK OFFICE
CERTIFICATE OF CORRECTION

PATENT NO. : 4,974,188

DATED : November 27, 1990

INVENTOR(S) : Quentin E. Dolecek

It is certified that error appears in the above—identified patent and that said Letters Patent is hereby corrected as shown below:

Column 14, line 10, delete line and substitute therefor
-- $C_{i-1} = G_{i-1} + C_i \cdot P_{i-1}$; and --.

Signed and Sealed this

Seventeenth Day of March, 1992

Attest:

HARRY F. MANBECK, JR.

Attesting Officer

Commissioner of Patents and Trademarks